United States Patent
Kokuzawa

(10) Patent No.: US 7,630,689 B2
(45) Date of Patent: Dec. 8, 2009

(54) ELECTRONIC DEVICE

(75) Inventor: Naoyuki Kokuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 11/507,489

(22) Filed: Aug. 22, 2006

(65) Prior Publication Data

US 2007/0049202 A1   Mar. 1, 2007

(30) Foreign Application Priority Data

Aug. 29, 2005   (JP) .............................. 2005-248144

(51) Int. Cl.
*H04B 1/00* (2006.01)
(52) U.S. Cl. ...................... 455/63.3; 455/130; 455/227; 455/228; 455/3.02; 363/21.02; 363/22; 363/72; 323/233
(58) Field of Classification Search ................ 455/63.3, 455/130, 227, 228, 3.02; 363/21.02, 22, 363/72; 323/233
See application file for complete search history.

(56) References Cited

U.S. PATENT DOCUMENTS

| 7,142,819 | B1 * | 11/2006 | Kang et al. | 455/63.3 |
| 2004/0052098 | A1 * | 3/2004 | Burstein et al. | 363/72 |
| 2008/0024094 | A1 * | 1/2008 | Nishihara et al. | 323/233 |

FOREIGN PATENT DOCUMENTS

JP   3439049   6/2003

* cited by examiner

*Primary Examiner*—Sanh D Phu
(74) *Attorney, Agent, or Firm*—Oblon, Spivak, McClelland, Maier & Neustadt, L.L.P.

(57) ABSTRACT

An electronic device that can receive an AM radio broadcast signal and has a switching power supply circuit, wherein a switching frequency of the switching power supply circuit is detected and a reception frequency of the AM radio broadcast signal is detected, and when a frequency as an integral multiple of the switching frequency falls within a reception frequency range of the AM radio broadcast signal, a load is added to the switching power supply circuit, whereby the switching frequency is changed.

2 Claims, 3 Drawing Sheets

ELECTRONIC DEVICE

CROSS REFERENCES TO RELATED APPLICATIONS

The present invention contains subject matter related to Japanese Patent Application JP 2005-248144 filed with the Japanese Patent Office on Aug. 29, 2005, the entire contents of which being incorporated herein by reference.

BACKGROUND OF THE INVENTION

1. Field of the Invention

The present invention relates to an electronic device that can receive an AM radio broadcast signal and has a switching power supply circuit (including a chopper regulator).

2. Description of the Related Art

In general, an electronic device such as an audio system in which a tuner, a CD or MD player, a cassette tape recorder and the like are integrated with each other can receive an AM radio broadcast signal and uses a switching power supply circuit (including a chopper regulator) as a power supply.

In such an electronic device in the past that can receive an AM radio broadcast signal and has a switching power supply circuit (including a chopper regulator), high switching noise is caused by a switching signal of the switching power supply circuit. It is therefore necessary to separate a power supply unit and a tuner unit from each other within the electronic device, or to provide a shield by for example enclosing either the power supply unit or the tuner unit with a sheet metal or the like.

In particular, at a time of a sudden increase in the load of the electronic device, for example at a time of recording an AM radio broadcast signal on a cassette tape recorder or at a time of loading a CD into a CD player, an inconvenience is caused in that the switching signal of the switching power supply circuit is heard as a sudden noise even when an AM radio broadcast signal is received in good conditions.

Japanese Patent No. 3439049 discloses a related-art method of changing the value of a voltage (a low voltage or a high voltage) supplied to an amplifier by a switching circuit according to the magnitude of an input signal in an audio system in which a tuner, an amplifier, a CD or MD player, a cassette tape recorder and the like are integrated with each other. In this case, when the tuner operates near the amplifier, noise caused by switching of the switching circuit leaks into a radio broadcast, and is output as noise from the tuner. A harmonic component of a switching signal of the switching circuit performing high-speed operation, in particular, tends to be superimposed as noise in a frequency band of an AM radio broadcast signal. In order to eliminate this phenomenon, when an AM radio broadcast signal is received, the switching circuit is set in a non-operating state, and only a low voltage is supplied to the amplifier.

SUMMARY OF THE INVENTION

However, when the power supply unit and the tuner unit are separated from each other within the electronic device, a degree of freedom in designing the electronic device is lowered, and the electronic device is increased in size.

When a shield is provided by for example enclosing either the power supply unit or the tuner unit with a sheet metal or the like, this shield increases cost.

In view of the above, it is desirable to eliminate interference by the switching signal of a switching power supply circuit at a time of receiving an AM radio broadcast signal with a simple constitution.

According to an embodiment of the present invention, there is provided an electronic device that can receive an AM radio broadcast signal and has a switching power supply circuit, wherein a switching frequency of the switching power supply circuit is detected and a reception frequency of the AM radio broadcast signal is detected, and when a frequency as an integral multiple of the switching frequency falls within a reception frequency range of the AM radio broadcast signal, a load is added to the switching power supply circuit, whereby the switching frequency is changed.

According to the embodiment of the present invention, when the frequency as an integral multiple of the switching frequency of the switching power supply circuit falls within the reception frequency range of the AM radio broadcast signal, the load is added to the switching power supply circuit, whereby the switching frequency is changed. Therefore, interference by the switching signal of the switching power supply circuit at the time of receiving the AM radio broadcast signal is eliminated with a simple constitution.

DETAILED DESCRIPTION OF THE PREFERRED EMBODIMENT

A preferred embodiment of an electronic device according to the present invention will hereinafter be described with reference to the drawings. An example in FIG. 1 is an audio system in which a tuner, a power amplifier circuit, a CD player, a cassette tape recorder and the like are integrated with each other.

Figure 1:
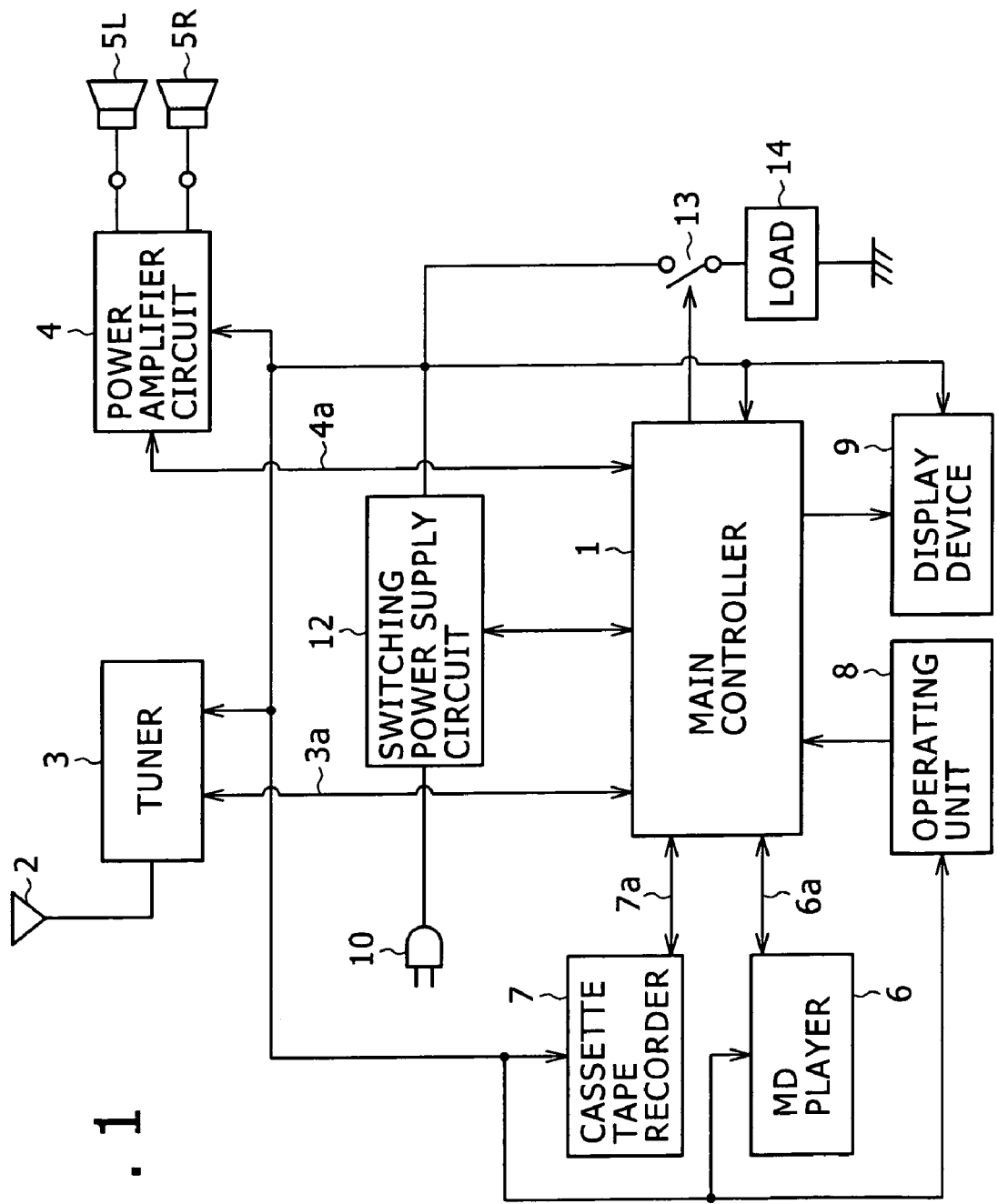
FIG. 1 is a block diagram showing a preferred embodiment of an electronic device according to the present invention.

In FIG. 1, reference numeral 1 denotes a main controller formed by a microcomputer or the like forming the audio system. Reference numeral 2 denotes an antenna that can receive an AM radio broadcast signal, an FM radio broadcast signal and the like. The AM radio broadcast signal, the FM radio broadcast signal and the like from the antenna 2 are supplied to a tuner 3.

The tuner 3 selects a radio broadcast signal from a desired broadcasting station according to a reception control signal supplied from the main controller 1 via a bus line 3a. The tuner 3 supplies the selected radio broadcast signal to the main controller 1 via the bus line 3a.

Thus, the tuner 3 selects for example an AM radio broadcast signal specified by the main controller 1. The main controller 1 therefore knows the reception frequency b of the AM radio broadcast signal being received.

The audio signal selected by the main controller 1 is supplied to a power amplifier circuit 4 via a bus line 4a. The audio signal is supplied from the power amplifier circuit 4 to speakers 5L and 5R.

Reference numeral 6 in FIG. 1 denotes a CD player for reproducing a CD. The CD player 6 is controlled to select and reproduce a musical piece, for example, according to a control signal supplied from the main controller 1 via a bus line 6a. In addition, a reproduced audio signal from the CD player 6 is supplied to the main controller 1 via the bus line 6a.

Reference numeral 7 denotes a cassette tape recorder for recording a cassette tape and reproducing the cassette tape. The cassette tape recorder 7 is controlled to perform the recording and reproduction by a control signal supplied from the main controller 1 via a bus line 7*a*. In addition, an audio signal for recording which signal is selected by the main controller 1 is supplied from the main controller 1 to the cassette tape recorder 7 via the bus line 7*a*.

Further, the audio signal reproduced by the cassette tape recorder 7 is supplied to the main controller 1 via the bus line 7*a*.

Reference numeral 8 denotes an operating unit for a user to give a desired instruction to the main controller 1. An instruction signal from the operating unit 8 is supplied to the main controller 1. Reference numeral 9 denotes a display device for displaying for example a description of control performed by the main controller 1.

Reference numeral 10 denotes a plug supplied with commercial power. The commercial power supplied to the plug 10 is supplied to a well known switching power supply circuit 12. The switching power supply circuit 12 lowers switching frequency as a load is increased, as shown in Table 1 and FIG. 3.

Also, in this example, the output side of the switching power supply circuit 12 is grounded via a series circuit of a connection switch 13 and a load 14.

Used as this load 14 is for example a resistor having a resistance value predetermined by relation between a normal load (output current) of the electronic device as the audio system and the switching frequency.

In this example, a switching signal of the switching power supply circuit 12 is supplied to the main controller 1, and the main controller 1 detects the switching frequency of the switching signal.

In this example, letting a be the detected switching frequency of the switching signal of the switching power supply circuit 12, b be the reception frequency of the AM radio broadcast signal, and c be a region (for example 5 to 10 kHz) where switching noise is mixed in with the reception frequency as a center frequency, the main controller 1 performs the following operation.

$$b-c < a \times N < b+c$$

TABLE 1

| OUTPUT CURRENT [A] | INPUT VOLTAGE AC 95 [V] | | INPUT VOLTAGE AC 120 [V] | | INPUT VOLTAGE AC 150 [V] | |
|---|---|---|---|---|---|---|
| | OUTPUT VOLTAGE [V] | SWITCHING FREQUENCY [kHz] | OUTPUT VOLTAGE [V] | SWITCHING FREQUENCY [kHz] | OUTPUT VOLTAGE [V] | SWITCHING FREQUENCY [kHz] |
| 0.05 | 29.13 | 58.5 | 29.32 | 70.9 | 29.6 | 105 |
| 1 | 29.07 | 55.8 | 29.24 | 67.1 | 29.45 | 92 |
| 2 | 29.04 | 55.8 | 29.19 | 64 | 29.36 | 87.7 |
| 3 | 29 | 54 | 29.15 | 64 | 29.31 | 85.5 |
| 4 | 28.96 | 53 | 29.12 | 62.5 | 29.26 | 80.64 |
| 5 | 28.92 | 52 | 29.07 | 50.6 | 29.21 | 79 |
| 6 | 28.88 | 51 | 29.03 | 58.8 | 29.16 | 76 |
| 7 | 28.56 | 46 | 28.99 | 56.5 | 29.12 | 75 |
| 8 | | | 28.94 | 55.8 | 29.07 | 73 |

Figure 3:
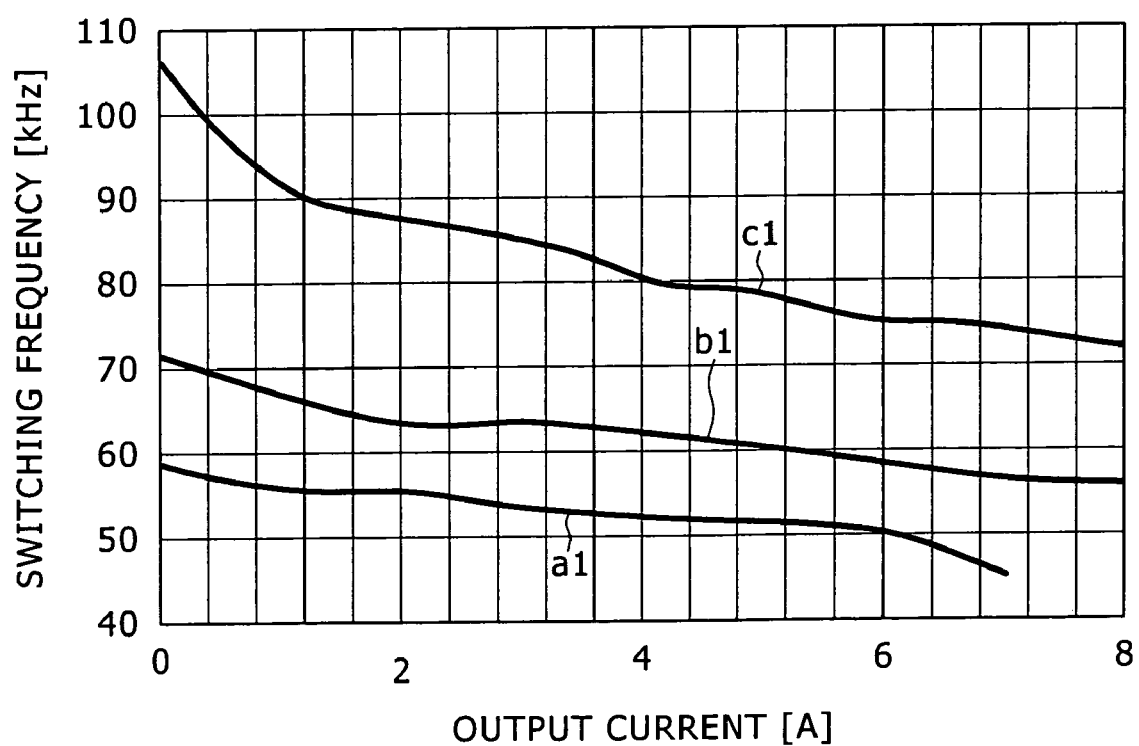
FIG. 3 is a diagram of assistance in explaining the present invention.

FIG. 3 represents Table 1 by curves. The curve a1 in FIG. 3 represents changes in switching frequency when an output current for the load is changed from 0.05 A to 1 A to 2 A to 3 A to 4 A to 5 A to 6 A to 7 A, an input voltage of the switching power supply circuit 12 being AC 95 V. The switching frequency is sequentially 58.5 kHz, 55.8 kHz, 55.8 kHz, 54 kHz, 53 kHz, 52 kHz, 51 kHz, and 46 kHz.

The curve b1 in FIG. 3 represents changes in switching frequency when the output current for the load is changed from 0.05 A to 1 A to 2 A to 3 A to 4 A to 5 A to 6 A to 7 A to 8 A, the input voltage of the switching power supply circuit 12 being AC 120 V. The switching frequency is sequentially 70.9 kHz, 67.1 kHz, 64 kHz, 64 kHz, 62.5 kHz, 60.5 kHz, 58.8 kHz, 56.5 kHz, and 55.8 kHz.

The curve c1 in FIG. 3 represents changes in switching frequency when the output current for the load is changed from 0.05 A to 1 A to 2 A to 3 A to 4 A to 5 A to 6 A to 7 A to 8 A, the input voltage of the switching power supply circuit 12 being AC 150 V. The switching frequency is sequentially 105 kHz, 92 kHz, 87.7 kHz, 85.5 kHz, 80.64 kHz, 79 kHz, 76 kHz, 75 kHz, and 73 kHz.

In this example, a direct-current voltage obtained on an output side of the switching power supply circuit 12 is supplied as power to each of the main controller 1, the tuner 3, the power amplifier circuit 4, the CD player 6, the cassette tape recorder 7, the operating unit 8, and the display device 9.

where N is a positive integer.

This expression means the detection of whether N integral times the switching frequency a of the switching power supply circuit 12 falls within a range of b−c to b+c of the reception frequency of the AM radio broadcast signal.

In this example, when this inequality $$b-c < a \times N < b+c$$

holds in the main controller 1, a harmonic component of N integral times the switching frequency a falls within the reception frequency range, and thus causes switching noise. In this example, at this time, the connection switch 13 is turned on to add the load 14 to the output side of the switching power supply circuit 12. The switching frequency a of the switching power supply circuit 12 is thereby changed so that the harmonic component (a×N) of the switching frequency a is b−c or lower or b+c or higher, which is outside the reception frequency range of the AM radio broadcast signal.

Figure 2:
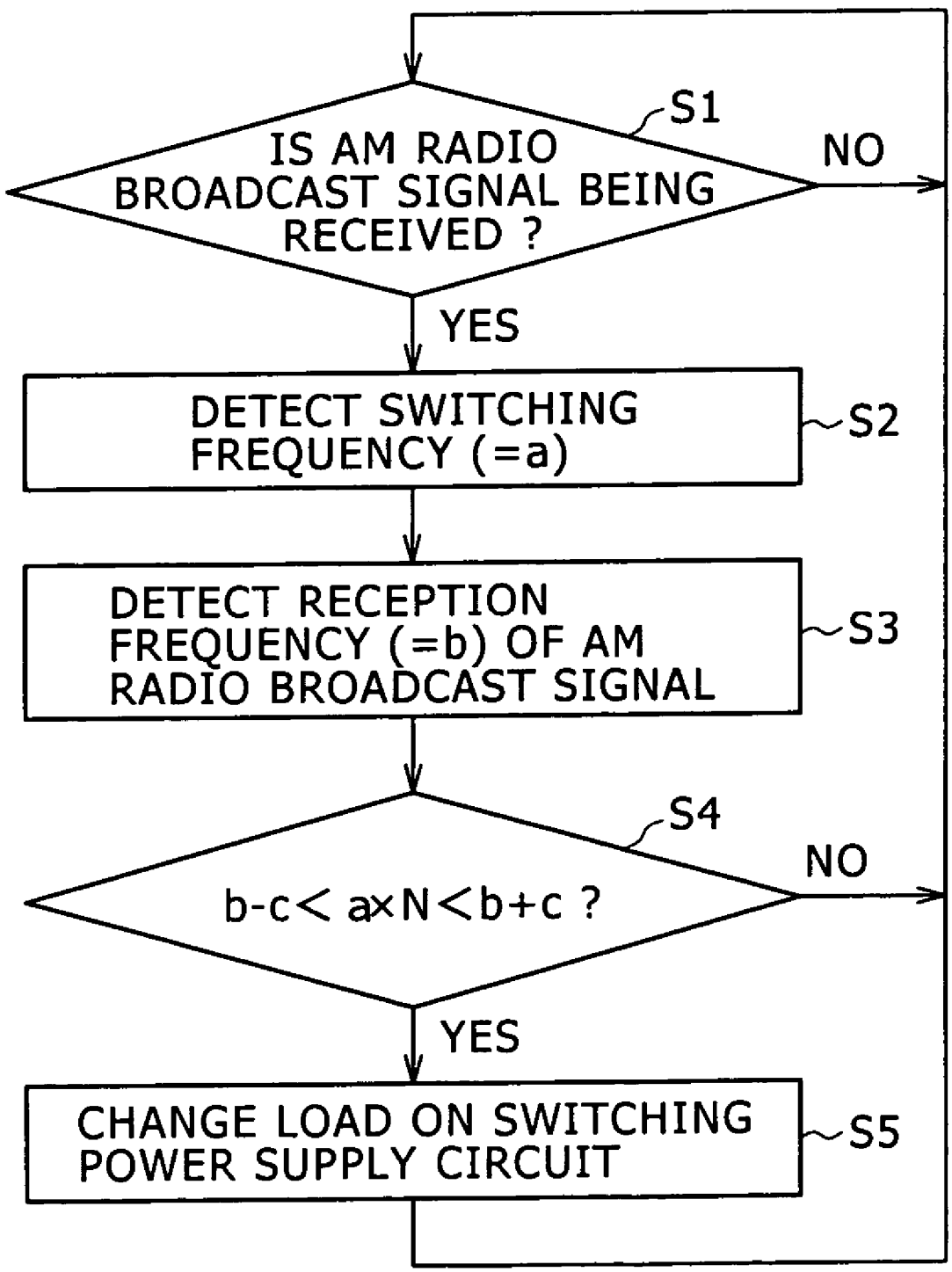
FIG. 2 is a flowchart of assistance in explaining the present invention.

Operation in this example will further be described with reference to a flowchart of FIG. 2. In this example, whether an AM radio broadcast signal is being received is determined (step S1). When no AM radio broadcast signal is being received, the main controller 1 waits until an AM radio broadcast signal is received. When an AM radio broadcast signal is received, the main controller 1 detects the switching frequency a of the switching power supply circuit 12 (step S2), and detects the reception frequency b of the AM radio broadcast signal (step S3).

Because the reception frequency b of the AM radio broadcast signal is determined by the tuner 3 according to an instruction from the main controller 1, the main controller 1 knows the reception frequency b of the AM radio broadcast signal.

Next, whether $$b-c < a \times N < b+c$$

is determined (step S4). That is, whether the harmonic component (a×N) of the switching frequency a falls within the reception frequency range of b−c to b+c of the AM radio broadcast signal is determined (step S4). When the harmonic component (a×N) of the switching frequency a does not fall within the reception frequency range, it is considered that there is no switching noise. The process returns to step S1.

When it is determined in step S4 that the harmonic component (a×N) of the switching frequency a falls within the reception frequency range, switching noise occurs. Thus, the connection switch 13 is turned on to add the load 14 to the output side of the switching power supply circuit 12. The switching frequency of the switching power supply circuit 12 is thereby changed so that the harmonic component (a×N) of the switching frequency a is b−c or lower or b+c or higher, which is outside the reception frequency range of the AM radio broadcast signal. The process thereafter returns to step S1.

In step S5, when the connection switch 13 is already on, the connection switch 13 is turned off. The load on the output side of the switching power supply circuit is thereby changed (the load 14 is removed) so that the harmonic component (a×N) of the switching frequency a is b−c or lower or b+c or higher, which is outside the reception frequency range of the AM radio broadcast signal.

In this case, because the load 14 is only added to or removed from the output side of the switching power supply circuit 12, no adverse effect is produced on the other load on the output side of the switching power supply circuit 12.

As described above, according to this example, when the frequency (a×N) N integral times the switching frequency a of the switching power supply circuit 12 falls within the reception frequency range of the AM radio broadcast signal, the switching frequency is changed by adding the load 14 to the switching power supply circuit 12. It is therefore possible to maintain an excellent S/N with a simple configuration at a time of receiving an AM radio broadcast signal without interference of the switching signal of the switching power supply circuit 12.

Further, in the past, at a time of a sudden increase in the load of an electronic device, for example at a time of recording an AM radio broadcast signal on a cassette tape recorder 7 or at a time of loading a CD into a CD player 6, the switching signal of a switching power supply circuit 12 is heard as a sudden noise even when an AM radio broadcast signal is received in good conditions. In this example, on the other hand, the noise is eliminated, and an AM radio broadcast signal can be received in stable conditions at all times.

The electronic device according to this example eliminates the need for separating a power supply unit and a tuner unit from each other, thus providing a higher degree of freedom to the design of the electronic device. In addition, because it is not necessary to separate the power supply unit and the tuner unit from each other, the electronic device can be miniaturized.

Further, in this example, it is not necessary to shield the power supply unit or the tuner unit. Therefore the cost of materials for designing the electronic device can be reduced.

It is to be noted that while in the above-described example, the present invention is applied to an audio system, the present invention can of course be applied to other electronic devices.

In addition, the present invention is not limited to the above-described example, and various other constitutions can of course be employed without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device receiving an AM radio broadcast signal, comprising:
    a switching power supply circuit having a switching frequency; and
    a detector to detect a reception frequency of the AM radio broadcast signal and the switching frequency, and when a frequency as an integral multiple of said switching frequency falls within a reception frequency range of said AM radio broadcast signal, a load is applied to said switching power supply circuit to change the switching frequency, wherein letting b be said reception frequency, and c be a frequency range where switching noise is mixed in with said reception frequency as a center frequency, said reception frequency range is a range of b−c to b+c.

2. The electronic device as claimed in claim 1, wherein said load is a resistor.

* * * * *